United States Patent [19]

Stephens

[11] Patent Number: 5,352,075
[45] Date of Patent: Oct. 4, 1994

[54] ROTARY CUTTING TOOL HAVING AN AXIAL ADJUSTMENT

[75] Inventor: Ray Stephens, Sterling Hts., Mich.

[73] Assignee: Valenite Inc.

[21] Appl. No.: 122,964

[22] Filed: Sep. 20, 1993

[51] Int. Cl.⁵ .......................... B23C 5/26; B24B 41/00; B23B 51/00
[52] U.S. Cl. .................. 409/234; 451/342; 407/36; 408/179
[58] Field of Search ............... 409/232, 234; 407/36, 407/46; 51/168; 408/161, 162, 168, 169, 171, 179

[56] References Cited

U.S. PATENT DOCUMENTS

| | | | |
|---|---|---|---|
| 1,881,665 | 10/1932 | Kilzer | 408/179 |
| 1,949,872 | 3/1934 | Miller | 408/162 |
| 4,257,197 | 3/1981 | Lombard | 409/234 X |

FOREIGN PATENT DOCUMENTS

| | | | |
|---|---|---|---|
| 1282421 | 11/1968 | Fed. Rep. of Germany | 408/162 |
| 2235782 | 2/1973 | Fed. Rep. of Germany | 408/161 |
| 2615913 | 10/1977 | Fed. Rep. of Germany | 407/36 |
| 1296816 | 5/1962 | France | 407/36 |
| 766845 | 10/1980 | U.S.S.R. | 51/168 |

Primary Examiner—William Briggs
Attorney, Agent, or Firm—Bill C. Panagos

[57] ABSTRACT

An adjustable cutting assembly includes a wedge member extending transversely through a clearance opening in a sleeve portion of a cutting element adapter that is slidable supported on a rotary arbor. Radial motion of the wedge member can be used to shift the adapter axially on the arbor, thereby adjusting or controlling the depth of cut of the cutting element. An axially oriented locking bolt is used to clamp the wedge member between opposed guide surfaces on the adapter and arbor, so that during machining operations the tool assembly has the rigidity of a non-adjustable tool assembly.

11 Claims, 2 Drawing Sheets

ROTARY CUTTING TOOL HAVING AN AXIAL ADJUSTMENT

FIELD OF THE INVENTION

This invention relates to metal cutting tools, and particularly to adjusting devices for such tools, whereby the depth of cut can be varied or controlled.

BACKGROUND OF THE INVENTION

A face milling tool assembly is designed to form a flat surface on a work piece. Typically the work piece is mounted on a horizontal table so that it can be moved in a horizontal plane beneath a vertical axis rotary milling tool. Cutter teeth on the lower end surface of the rotating tool remove material from the upper face of the work piece; the horizontal table is moved back and forth so that the upper face of the work piece is smoothed, flattened, and machined to a desired dimension and surface finish.

The present invention is directed to an adjusting device incorporated into a conventional face milling tool assembly, whereby the depth of cut can be varied or controlled in a relatively precise fashion.

SUMMARY OF THE INVENTION

The invention contemplates an adjustable tool assembly, e.g. a face milling tool assembly, wherein a cutting element adapter is axially adjustable on a rotary arbor, such that the depth of cut of the cutting element can be adjusted in a relatively precise fashion, e.g. within an accuracy of approximately 0.0005 inch or less.

The tool assembly includes a wedge member that extends transversely through a clearance opening in the adapter, whereby the wedge member can be shifted in a radial direction across the tool rotational axis. The wedge member is sandwiched between a rotary arbor and the adapter. A radial face on the wedge member is slidable on a radial surface of the adapter. The wedge member has a second face that has a slight angulation relative to a radial plane taken through the tool rotational axis. The angulated face of the wedge member seats flatwise against a mating acutely-angled surface on the arbor.

As the wedge member is adjusted transversely across the rotational axis of the tool assembly the wedging action of the wedge member produces a relatively slight axial adjustment of the cutter element adapter relative to the arbor. This axial adjustment can be used to precisely control the depth of cut of the cutting tool assembly.

THE DRAWINGS

DESCRIPTION OF A PREFERRED EMBODIMENT OF THE INVENTION

Figure 1:
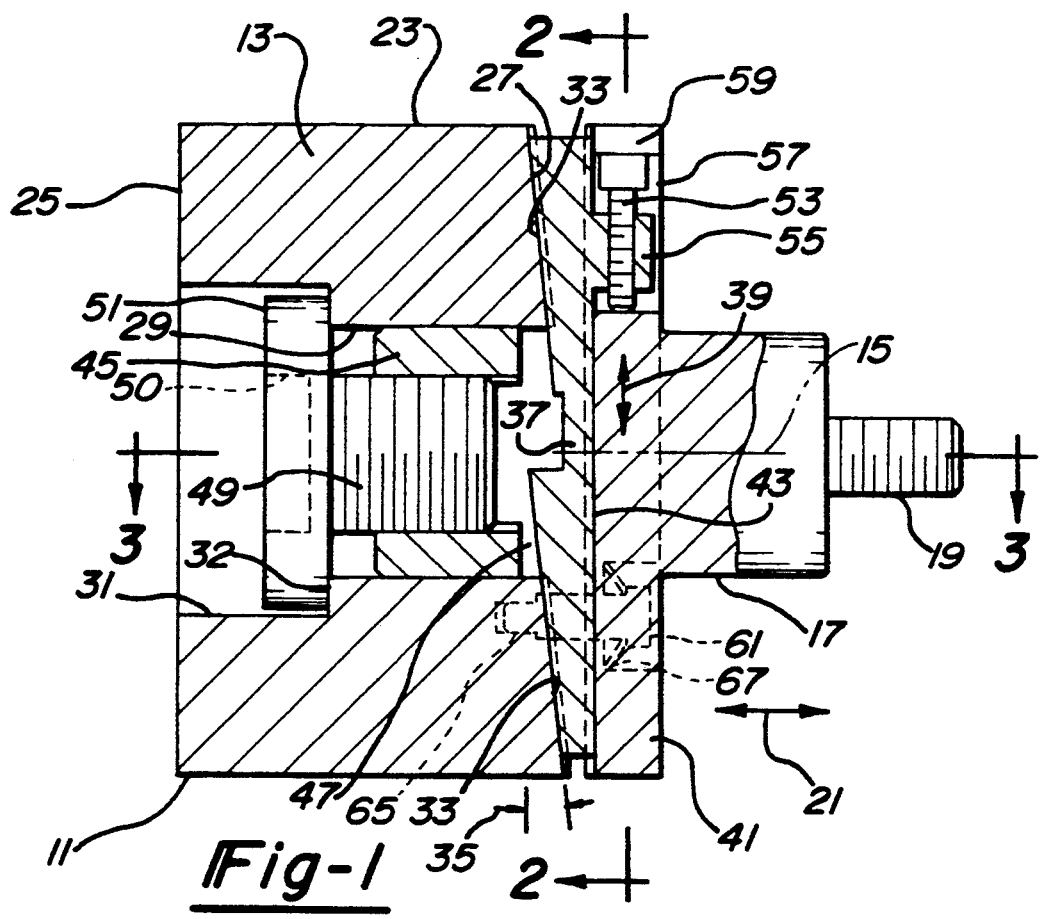
FIG. 1 is a sectional view taken through a cutting tool assembly embodying the invention.

The drawings show an adjustable cutting tool assembly 11 that includes a rotary arbor 13 designed to be mounted in a conventional drilling machine or lathe for rotation around a central axis 15. The arbor provides a supporting platform for a cutting element adapter 17 that is in axial alignment with the right face of the arbor (as viewed in FIG. 1).

At its rightmost end the adapter 17 has a threaded stem 19 designed to mount a face milling tool (not shown). Typically the face milling tool comprises a cylindrical shank having a threaded hole that can be threaded onto stem 19; an end surface of the shank has one or more cutter element cartridges mounter therein, such that when the tool assembly is rotated around the central axis 15 the cutter elements wipe across the surface of a work piece to machine a flat surface thereon. In many cases the work piece is supported on a fixture that is movable in a plane normal to central axis 15, such that an extensive surface area of the work piece can be machined by the face milling tool.

The depth of cut of the milling tool can be controlled or varied by adjusting the adapter 17 axially relative to arbor 15, as indicated by arrow 21 in FIG. 1. The present invention is concerned with the structure for achieving a precision axial adjustment of adapter 17 relative to arbor 13.

Referring more particularly to the construction of arbor 13, the arbor has a cylindrical side surface 23, a rear face 25, and a front face 27. A cylindrical axial hole 29 extends through the arbor from the rear face to the front face; a counterbore 31 is machined in rear face 25 to form an annular shoulder 32.

Front face 27 of arbor 13 comprises two parallel flat guide surfaces 33 acutely angled to an imaginary radial plane generated from rotational axis 15. The angulation angle of surfaces 33 is preferably about five degrees, as indicated by arrows 35 in FIG. 1. Each guide surface 33 is formed by a shallow groove machined into the front face of the arbor; the side surfaces of the two grooves slidably contain or confine edge areas of the slidable wedge member 37 that is sandwiched between arbor 13 and adapter 17. The wedge member can slide transversely across rotational axis 15, as indicated by arrows 39 in FIG. 1; however, the wedge member is otherwise retained or confined against any other type of movement (by the confining 17). grooves formed on the facing surfaces of arbor 13 and adapter Adapter 17 comprises a cylindrical head 41 having a flat radial guide surface 43 facing the aforementioned angled guide surfaces 33 formed on arbor 13. Radial guide surface 43 is formed by a shallow groove machined into the rear (or left) face of cylindrical head 41. The opposing shallow grooves on adapter 17 and arbor 13 slidably guide the wedge member 37 for transverse slidable motion, as indicated by arrows 39 in FIG. 1.

Extending leftwardly from cylindrical head 41 is a cylindrical sleeve 45. A slot-like clearance opening 47 extends transversely through sleeve 45 to freely accommodate wedge member 37. Opening 47 is wider than wedge member 37 (as viewed in FIG. 1), so that the wedge member can move freely in the arrow 39 directions without encountering any resistance from sleeve 45.

Sleeve 45 has an axially slidable fit in the aforementioned cylindrical hole 29, whereby the adapter 17 is centered on the arbor central axis 15. Sleeve 45 and hole 29 form a radial bearing for absorbing any radial loads that might be generated by the milling (cutting) operations.

As previously noted, wedge member 37 is sandwiched between the front face of arbor 13 and the rear face of adapter 17. The rear end surfaces of the wedge member slidably mate with guide surfaces 33 on arbor 13, and the front end surface of the wedge member slidably mates with the flat radial surface 43 on adapter 17. The aforementioned grooves on the opposing surfaces of the arbor and adapter encompass the edges of the wedge member, and thus slidably confine the wedge member to radial motion, as indicated by arrows 39 in FIG. 1.

An axially extending bolt 49 is threaded into an internally threaded area of sleeve 45, so that head 51 of the bolt can seat against shoulder 32 formed by counter bore 31. A non-circular socket 50 is provided in head 51 of the bolt to facilitate the bolt-turning action. When bolt head 51 pressures against shoulder 32 the bolt draws adapter 17 leftwardly (in FIG. 1), thereby causing the wedge member 37 to be tightly clamped between arbor 13 and adapter 17. While the tool assembly is rotating (i.e. during a machining operation) bolt 49 will be in a tightened condition for producing a desired clamping action on wedge member 37. The arbor, adapter, and wedge member are rigidly connected together to act as a single unit.

When bolt 49 is loosened the arbor and adapter relax from wedge member 37 so that the wedge member can be moved in the direction indicated by arrows 39 (FIG. 1). Upward motion of the wedge member (as viewed in FIG. 1) effectively reduces the axial dimension of the wedge member; downward motion of the wedge member effectively increases its axial dimension. After the desired motion of the wedge member has been achieved, bolt 49 can be again tightened to cause the arbor and adapter to clamp the wedge member in its newly adjusted position.

Figure 2:
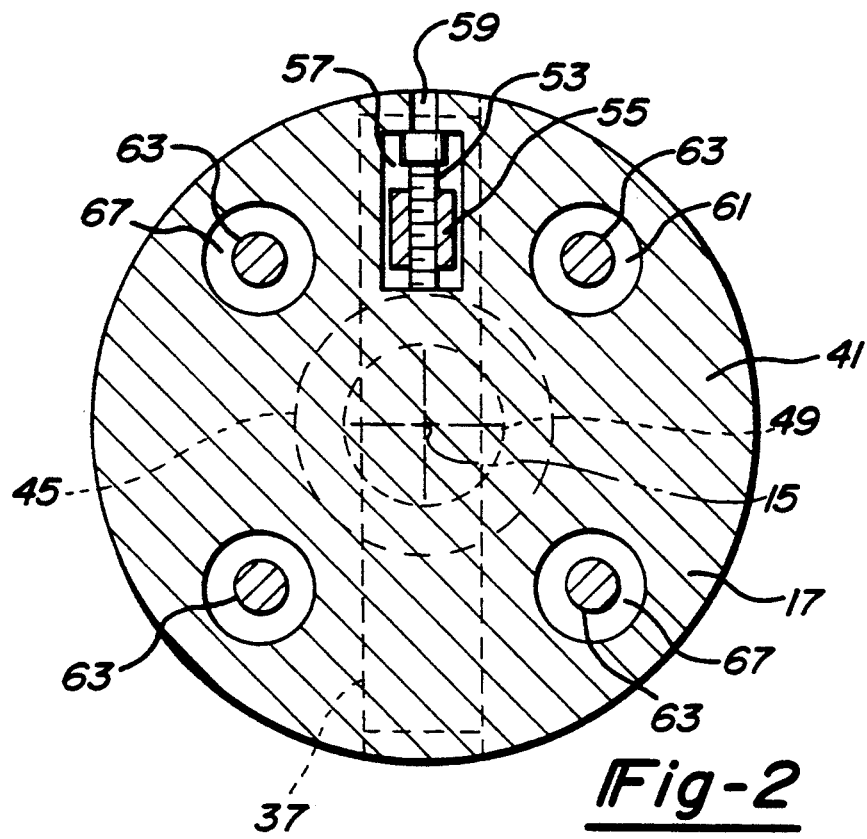
FIG. 2 is a sectional view taken on line 2—2 in FIG. 1.

A set screw 53 is used to incrementally move (or adjust) the wedge member 37. The set screw extends radially through a threaded opening in an ear 55 that extends from the front surface of wedge member 37. As shown in FIG. 2, the length of set screw 53 is substantially the same as the radial dimension of a recess 57 formed in adapter 17; the set screw can turn freely but it cannot move up or down in the recess. A slot 59 is formed in the upper edge of the adapter head 41 for access to a non-circular socket in the head of screw 53. To turn the set screw in either direction a turning implement, such as an Allen wrench, is inserted through slot 59 into the head of the screw.

The ends of the screw abut the end surfaces of recess 57, whereby turning motion of the screw causes ear 55 to advance up or down on the screw, depending on the direction of rotation of the screw. Ear 55 thus moves wedge member 37 in the arrow 39 direction. By making the length of screw 53 the same as the radial length of recess 57, it is possible to essentially eliminate any lost motion between the screw rotation and the ear 55 movement. The person then is able to turn the screw a given amount and be assured that the wedge member 38 will move a certain distance so as to produce a given axial adjustment of adapter 17. Assuming that screw 53 has forty threads per inch, one revolution of the screw will move wedge member 37 a distance of 0.025 inch. If angle 35 is five degrees, the corresponding axial adjustment of adapter 17 will be about 0.002 inch. Lesser axial adjustments of the adapter can be achieved by rotating screw 53 a fraction of a turn; e.g. one quarter revolution will produce an axial adjustment of 0.0005 inch.

when bolt 49 is in a slightly loosened condition the adapter will tend to shift away from the wedge member; excessive loosening of the bolt could cause the wedge member 37 to slip out of the confronting grooves in the adapter and arbor 13. To prevent such an action the arbor and adapter are tied together by four resilient tie elements 61. Each tie element comprises a pin 63 extending through aligned openings in the adapter and arbor. Threaded area 65 of each pin is in mesh with a threaded hole in arbor 17, such that the pin is rigidly anchored to the arbor while extending loosely through a hole in the adapter. An annular spring disk 67 encircles each pin 63 to exert a resilient axial force on the head of the pin.

The assembly of pin 63 and spring disk 67 tends to resiliently keep adapter 17 from moving so far away from arbor 13 as would enable the wedge member to slip out of the associated guide grooves. Each resilient tie element (assembly) 61 keeps the wedge member in slidable contact with the adapter 17 and arbor 13, whereby the wedge member slides smoothly in response to the turning motion of set screw 53.

The invention is concerned primarily with the construction of wedge member 37, and locking bolt 49 for clamping the wedge member in any selected position of adjustment. The tool assembly combines adjustability with the rigidity of a conventional non-adjustable construction. Wedge member 37 extends transversely through the adapter so that the tool assembly is balanced.

Figure 3:
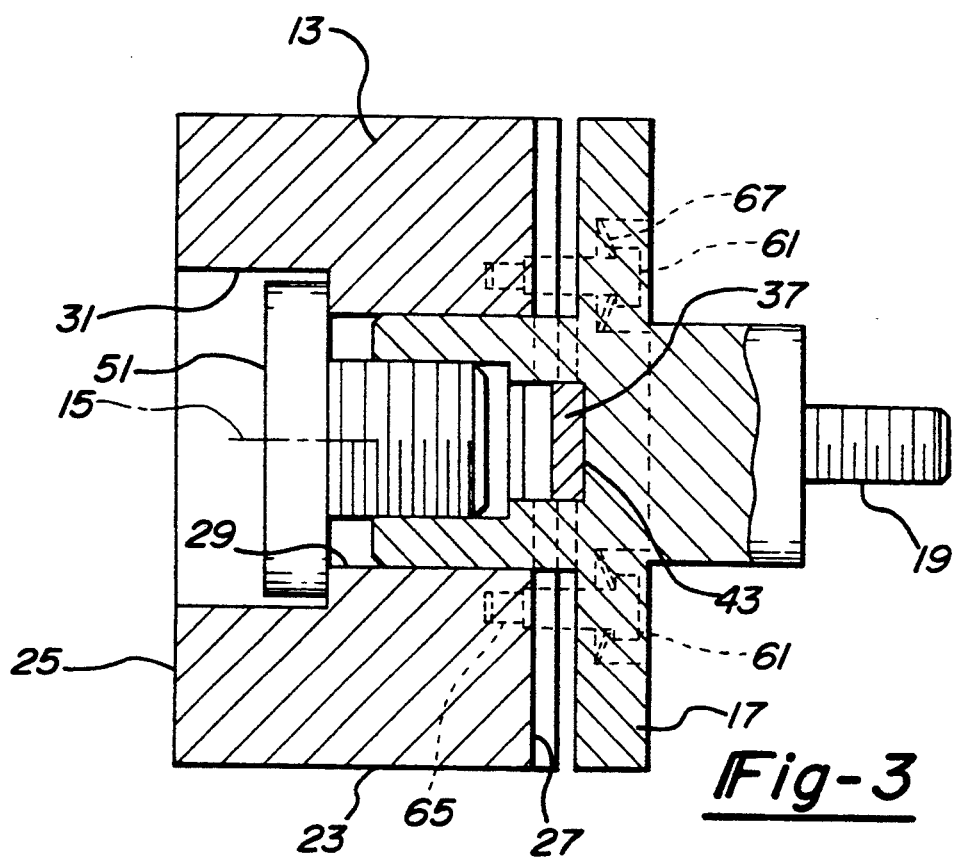
FIG. 3 is a sectional view taken on line 3—3 in FIG. 1
Figure 4:
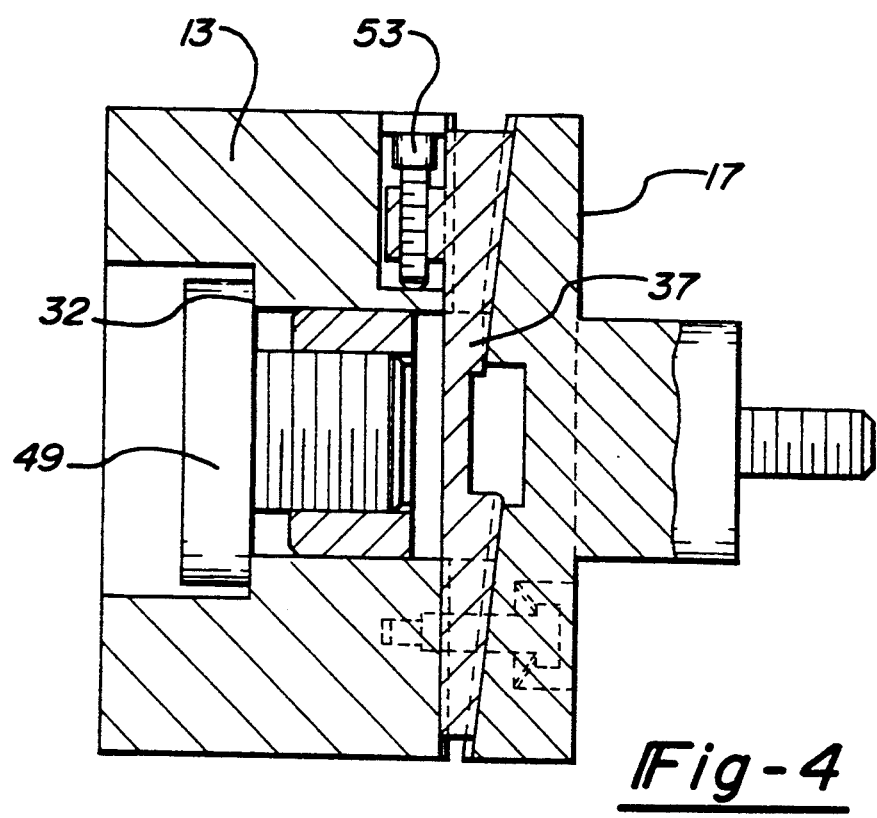
FIG. 4 is a view taken in the same direction as FIG. 1, but illustrating another embodiment of the invention.

FIGS. 1 through 3 illustrate a preferred form of the invention. FIG. 4 shows an alternate design embodying features of the invention. In the FIG. 4 arrangement the flat face of the wedge member seats against a flat front face of the arbor. The angled wedge surfaces on the wedge member are in mating engagement with acutely angled guide surfaces on the adapter.

The principal difference between the structures of FIGS. 1 and 4 is that in the FIG. 1 construction the wedge action takes place between the wedge member and arbor 13, whereas in the FIG. 4 construction the wedge action takes place between the wedge member and adapter 17. Both constructions use a locking bolt 49 to clamp the wedge member 37 to the arbor and adapter. FIG. 1 represents the preferred construction. However, it will be appreciated that some changes can be made in component design or arrangement while still practicing the invention.

What is claimed is:

1. An adjustable cutting tool assembly comprising a rotary arbor having a central rotational axis; a cutting element adaptor slideably mounted on said arbor for axial adjustments; a wedge member extending transversely through said adaptor; and a radially oriented set screw threadably engaged with said wedge member for moving said wedge member in a radial direction across said rotational axis; said adaptor having a flat radial surface engaged with said wedge member so that the wedge member is confined to radial motion; said arbor having two flat parallel wedge surfaces located on opposite sides of the arbor rotational axis and acutely angled to a radial plain in facing relation to the radial surface on the adaptor; said wedge member having two flat wedge surfaces acutely angled to a radial plain being in slidable engagement with said acutely angled wedge surfaces on said arbor, so that radial motion of said wedge member produces an axial adjustment of said adaptor.

2. The cutting tool assembly of claim 1, and further comprising an axially extending bolt having a head engaged with the arbor, and a threaded shank extending into said adapter, whereby said bolt can be turned to pull said adapter axially into a locked position wherein said wedge member is tightly clamped between the adapter and the arbor.

3. The cutting tool of claim 1, wherein said arbor has an axial hole, and said adapter has an axial sleeve having a slidable fit in said hole, whereby the adapter is centered on the arbor without restricting the axial adjustment of the adapter; said axial hole having a counter bore that defines an annular shoulder; and an axially extending bolt having a head seated in the counter bore against said shoulder, and a threaded shank extending into said sleeve, whereby said bolt can be turned to pull said adapter into a locked position wherein said wedge member is tightly clamped between the adapter and the arbor.

4. The cutting tool of claim 3, wherein said arbor and said adapter have confronting grooves extending radially in opposite directions away from the arbor rotational axis; said wedge member being seating between said arbor and said adapter within the confronting grooves so that the wedge member is restricted to radial movements; one of said confronting grooves having a flat radial guide surface; said wedge member having a mating flat radial surface slidably engaged with the radial surface on said one confronting groove; the other confronting groove having two parallel flat guide surfaces acutely angled to a radial plane; said wedge member having two flat parallel angled wedge surfaces slidably mated to the acutely angled guide surfaces on said other confronting groove, so that radial motion of the wedge member produces an axial adjustment of the adapter.

5. The cutting tool of claim 4, wherein said wedge member has an ear extending from its flat radial surface, and a radial threaded hole extending through said ear; said set screw having a threaded shank extending through said threaded hole; one of said adapter and said arbor having a recess therein accommodating said ear; said set screw being turnable to exert a radial operating force on the ear.

6. The cutting tool of claim 5, wherein said recess is formed in the adapter.

7. The cutting tool of claim 4, and further comprising a plurality of resilient tie elements extending between said adapter and said arbor; each tie element comprising a headed pin extending through a clearance hole in the adapter into the arbor, and a spring trained around the pin to exert an axial resilient force tending to draw the adapter toward the arbor, whereby said wedge member is resiliently supported within the confronting grooves.

8. The cutting tool of claim 7, wherein there are four resilient tie elements extending between the adapter and the arbor.

9. An adjustable cutting tool assembly comprising a rotary arbor having a central rotational axis; a cutting element adapter slidably mounted on said arbor for axial adjustment; a wedge member extending transversely through said adapter; a radially oriented set screw for moving said wedge member in a radial direction across said rotational axis; said rotary arbor having a rear face and a front face, an axial hole extending through said arbor from its rear face to its front face, said axial hole having a counter bore in said rear face that defines an annular shoulder; the front face of said arbor having two radial grooves therein oriented on a diametrical line extending through the arbor rotational axis; said radial grooves forming two parallel guide surfaces acutely angled to a radial plane generated from he arbor rotational axis; said adapter comprising a head having a flat radial surface facing the front face of said arbor, and an axial sleeve extending from said flat radial surface into said axial hole; said sleeve having a slidable fit in said hole, whereby the adapter is centered in the arbor; said flat radial surface of the adapter having a diametrical groove facing the radial grooves in the arbor front face; said sleeve having a transverse clearance space proximate to the adapter radial surface; said wedge member extending through said clearance space between the adapter and the arbor; said wedge member having a radial front end surface seated in said diametrical groove of the adapter, and two rear end surfaces seated in said radial grooves of the arbor; the rear end surfaces of said wedge member having the same angulation as the parallel acutely angled guide surfaces, whereby radial motion of said wedge member produces an axial adjustment of the adapter; and an axially extending bolt having a head seated in the counter bore against said shoulder, and a threaded shank extending into said sleeve, whereby said bolt can be turned to pull said adapter into a locked position wherein said wedge member is tightly clamped between the adapter and the arbor.

10. The cutting tool of claim 9, wherein said adapter has a recess in its flat radial surface; said wedge member having an ear extending into said recess, and a threaded hole extending radially through said ear; said set screw having a thread type engagement with said threaded hole; said set screw being turnable to exert a radial force on the ear.

11. The cutting tool of claim 9, and further comprising a plurality of resilient tie elements extending between the adapter and the arbor; each tie element comprising a headed pin extending through the adapter into the arbor, and a spring trained around said pin to exert a resilient force tending to draw the adapter toward the arbor.

* * * * *